(12) United States Patent
Wang

(10) Patent No.: US 6,381,377 B1
(45) Date of Patent: Apr. 30, 2002

(54) GENERATING A HIGH RESOLUTION SCAN IMAGE WITH A LOW RESOLUTION SCAN SENSOR

(75) Inventor: John Y. A. Wang, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/337,049

(22) Filed: Jun. 21, 1999

(51) Int. Cl.[7] .................................................. G06K 9/32
(52) U.S. Cl. .......................... 382/299; 382/312; 358/474
(58) Field of Search ................................. 382/299, 300, 382/298, 312, 318, 254, 260, 284; 358/474, 505, 514, 483, 497, 486, 450, 540, 482, 494; 348/219, 207–210, 750, 756, 201–203

(56) References Cited

U.S. PATENT DOCUMENTS

| | | | | |
|---|---|---|---|---|
| 5,400,070 A | * | 3/1995 | Johnson et al. | 348/219 |
| 5,469,274 A | * | 11/1995 | Iwasaki et al. | 358/450 |
| 5,649,031 A | * | 7/1997 | Nakamura et al. | 382/254 |
| 5,949,924 A | * | 9/1999 | Noguchi et al. | 382/312 |
| 6,023,537 A | * | 2/2000 | Wada et al. | 382/312 |

* cited by examiner

*Primary Examiner*—Leo Boudreau
*Assistant Examiner*—Ishrat Sherali
(74) *Attorney, Agent, or Firm*—Thomas X. Li

(57) ABSTRACT

An image scanning apparatus is described that includes a sensor having an array of imaging elements that generates a plurality of scan lines of image pixels from an original image. The image scanning apparatus also includes a control module that controls the sensor to generate the scan lines, some of the scan lines are tilted with respect to other scan lines such that some image pixels of any two adjacent lines are not overlapped. An imaging module is also provided in the image scanning apparatus that generates a scan image from the scan lines such that image resolution of the scan image is increased without increasing scan resolution of the sensor. A method of increasing the image resolution of a scan image without increasing the scan resolution of the scanner is also described.

18 Claims, 8 Drawing Sheets

GENERATING A HIGH RESOLUTION SCAN IMAGE WITH A LOW RESOLUTION SCAN SENSOR

BACKGROUND OF THE INVENTION

1. Field of the Invention

The present invention pertains to digital imaging. More particularly, this invention relates to generating a high resolution scan image with a low resolution scan sensor, wherein the high resolution scan image is generated by generating additional multiple tilted scan lines using the low resolution scan sensor which requires no accurate movement of the scan sensor.

2. Description of the Related Art

It has been known that when an original image (i.e., an image rendered on a physical medium such as paper) is scanned by a scanner, a digital image of the original image is generated. Examples of the original image include photos and text/graphics documents. FIG. 1 is a perspective view of a prior art flatbed scanner 10. As can be seen from FIG. 1, the scanner 10 includes a housing 11 and a scan window 12, on which an original image can be placed for the scanner 10 to generate the corresponding digital image. The structure of the scanner 10 inside the housing 11 is schematically illustrated in FIG. 2.

As can be seen from FIG. 2, the scanner 10 is typically structured such that the original image 21 is illuminated by light from an light source (not shown) and the light reflected from the original image 21 is detected by a sensor 14 having an array of imaging elements (e.g., Charge Coupled Devices) to generate a number of scan lines, one scan line at a time. Each scan line includes a number of image pixels (e.g., the image pixels 33 through 33n in FIG. 3). The scan sensor 14 generates a scan line at one time. Then the scan sensor 14 advances in the scan direction to generate the next scan line. The control circuit 15 controls the movement of the scan sensor 14 to generate the scan lines.

The scan lines are sent to a control circuit 15 of the scanner 10 where the scan lines are assembled or constructed into a scan image 30 (see FIG. 3). The scan image 30 typically includes a digital image 31 of the original image 21 as well as background information. The scan image 30 is then cropped to obtain the digital image 31 without background image pixels. The digital image 31 can then be stored electronically, for example, in a computer system. The digital image 31 can also be electronically displayed and printed by a printer.

As is known, it is typically more desirable to view a high resolution scan image as it is typically clearer and reveals more details than a low resolution scan image. Using a low resolution sensor typically causes many fine image details to be imaged between the imaging elements of the sensor. This typically causes the resultant scan image to lose these fine details, thus causing the scan image to be more blurred and coarse.

The image resolution of a scan image is determined by two factors. One is the pixel distance between any two adjacent image pixels within a scan line (i.e, the scan density or imaging density). As can be seen from FIG. 3, the number of image pixels for each scan line corresponds to the number of the imaging elements within the sensor 14. The more imaging elements within the sensor 14, the shorter distance between any two image pixels and the higher image resolution of each scan line.

The other factor that determines the image resolution of a scan image is the scan advance distance between any two scan lines. As can be seen from FIG. 3, this distance determines the gap or space between any two adjacent scan lines. This scan distance is created when the sensor completes one scan line and advances to create the next scan line. The smaller this scan distance, the higher image resolution the scan image.

One prior art approach to increasing the image resolution of a scan image is to increase the imaging density of the sensor. As is known, the ideal imaging density for a sensor is that all the image elements of the sensor are aligned next to each other without any gap or space in between. However, it is almost impossible to fabricate a sensor with the-above mentioned ideal imaging density. Gap or space is required between any two adjacent image elements to prevent interferences. In addition, it is relatively difficult to manufacture high density image sensors as the manufacturing process typically requires significantly higher degree of precision. Moreover, such a high density image sensor is typically very costly to produce.

Another prior art approach to increasing the image resolution of a scan image is to reduce the scan distance between the scan lines. Using this prior art approach, the scan distance between any two adjacent scan lines is reduced such that more scan lines can be produced for the scan image. Here, the scan lines continue to remain parallel with one another. One disadvantage of this approach is that misalignment of the sensor may occur when the scan distance is made very small. Misalignment means that two adjacent scan lines are either completely overlapped or partially overlapped. Time, operation environment, and changes in device parameters all may contribute to misalignment when the scan distance is made very small. Very high level of precision control of the sensor movement are typically required to prevent misalignment, which can be very costly and sometimes impossible to accomplish.

SUMMARY OF THE INVENTION

One feature of the present invention is to increase image resolution of a scan image.

Another feature of the present invention is to increase image resolution of a scan image cost effectively.

A further feature of the present invention is to produce a scan image with high image resolution using a low resolution scanner without requiring precise movement of the scan sensor.

An image scanning apparatus is described that includes a sensor having an array of predetermined imaging elements to generate a plurality of scan lines of image pixels from an original image. The image scanning apparatus also includes a control module that controls the sensor to generate the scan lines, some of the scan lines are tilted with respect to other scan lines such that at least some image pixels of any two adjacent lines are not overlapped. An imaging module is also provided in the image scanning apparatus that generates a scan image from the scan lines such that image resolution of the scan image is increased without increasing scan resolution of the sensor.

In one embodiment, the control module controls the sensor to first generate the non-tilted scan lines and then controls the sensor to generate the tilted scan lines. In another embodiment, the control module controls the sensor to alternately generate the non-tilted scan lines and the tilted scan lines.

A method of enhancing image resolution of a scan image using a low scan resolution scanner is described. The method includes the step of generating a plurality of scan lines of image pixels from an original image using a scan sensor having an array of predetermined imaging elements. Some of the scan lines are tilted with respect to other scan lines such that some image pixels of any two adjacent lines are not overlapped. The method then generates the scan image from the scan lines such that image resolution of the scan image is increased without increasing the scan resolution of the sensor. The scan image is generated by processing the scan lines to collect and filter redundant information from the scan image.

In one embodiment, the method first generates the non-tilted scan lines and then the tilted scan lines. In another embodiment, the method alternately generates the non-tilted scan lines and the tilted scan lines.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
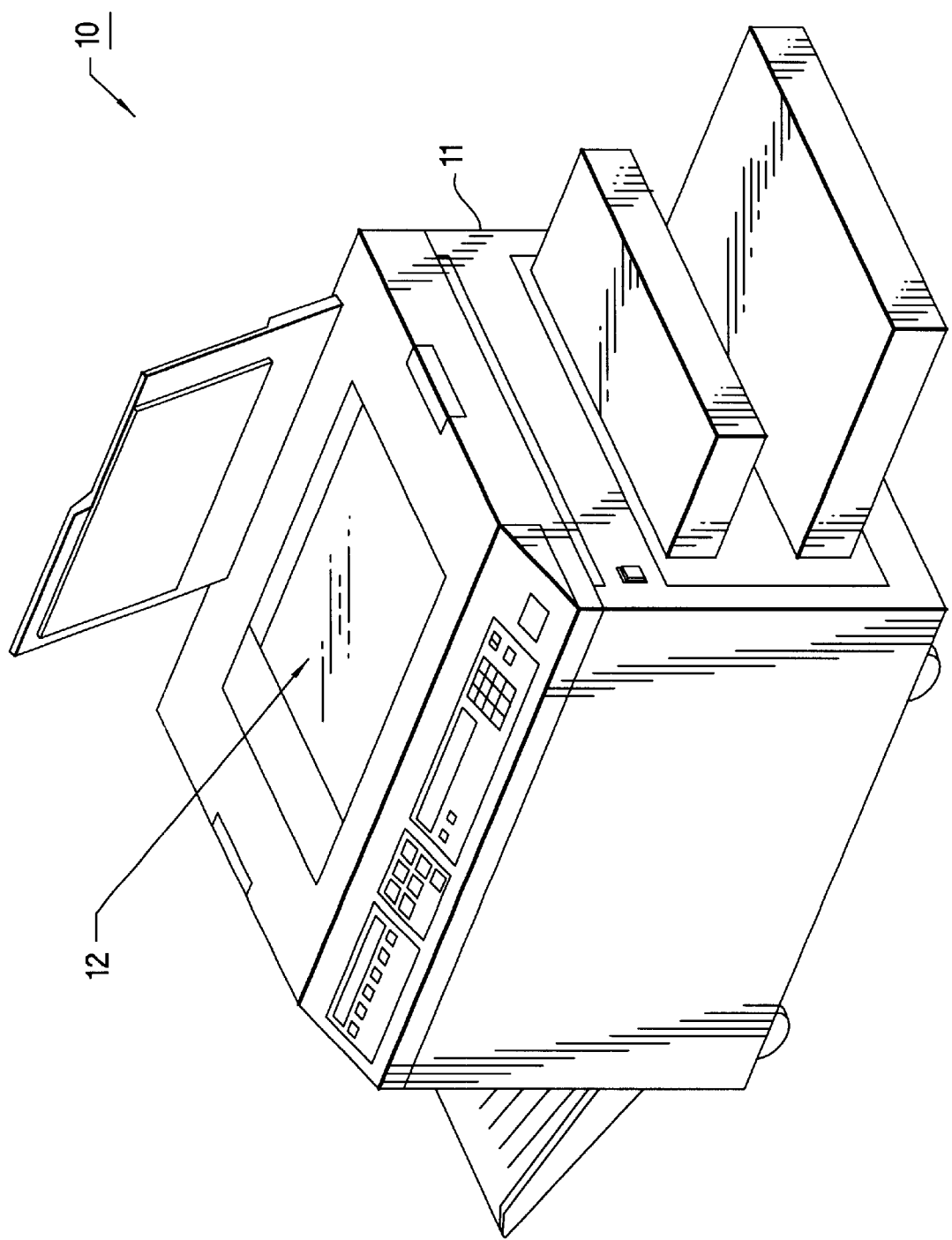
FIG. 1 shows a prior art flatbed scanner.
Figure 2:
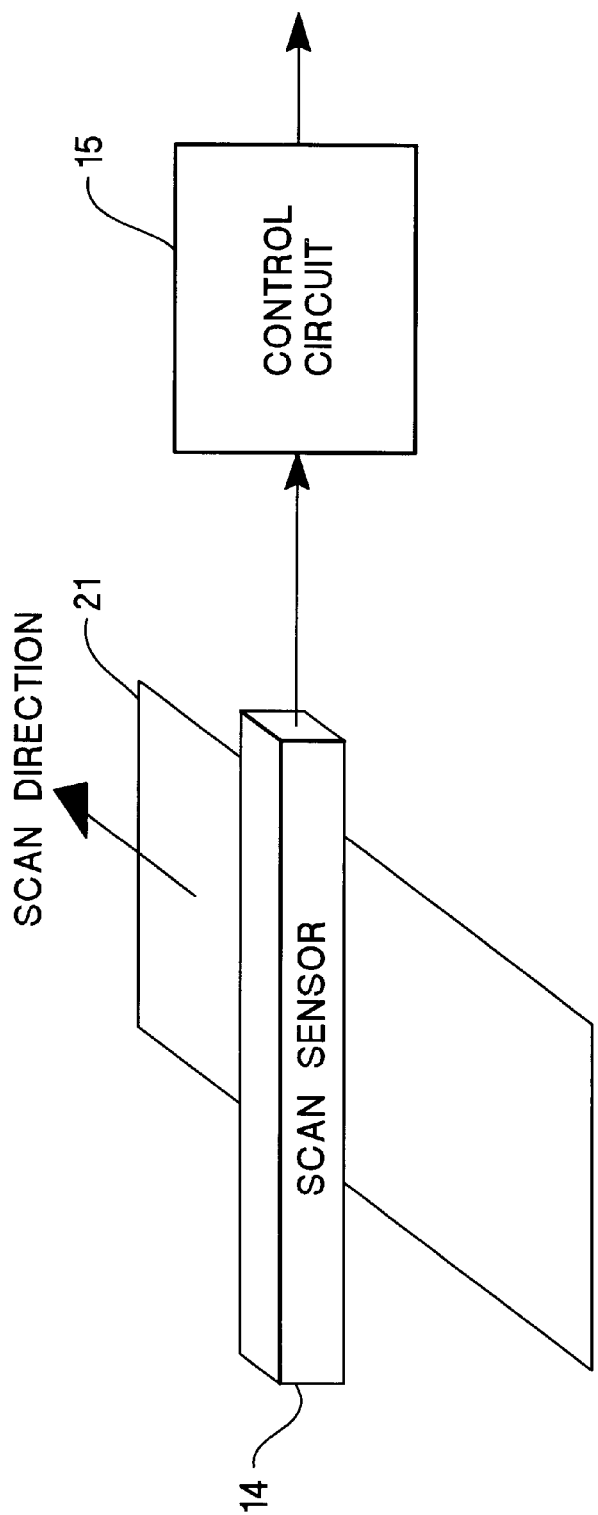
FIG. 2 schematically illustrates the structure and operation of the scanner of FIG. 1.
Figure 3:
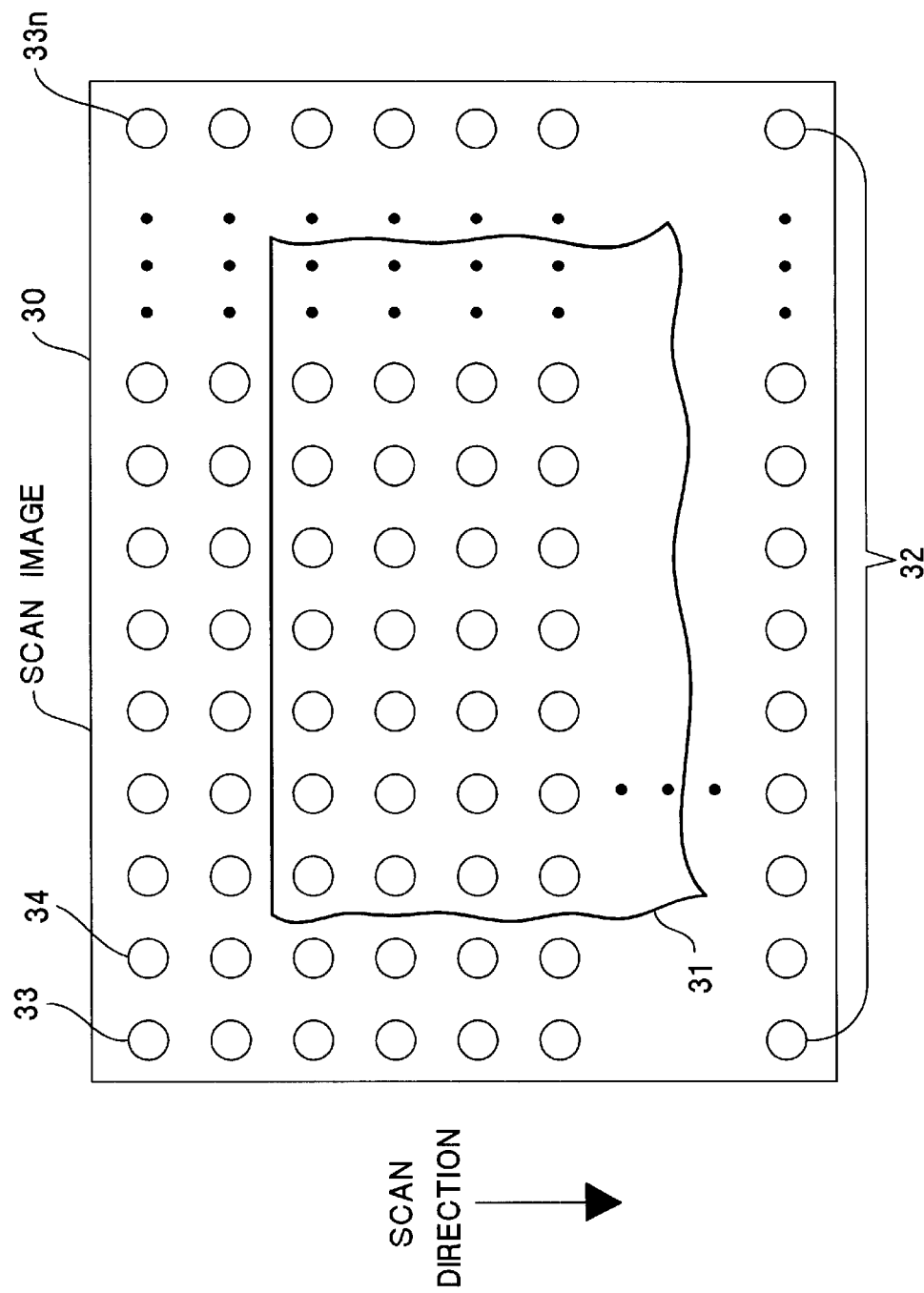
FIG. 3 shows the scan image generated by the prior art scanner of FIGS. 1–2.
Figure 4:
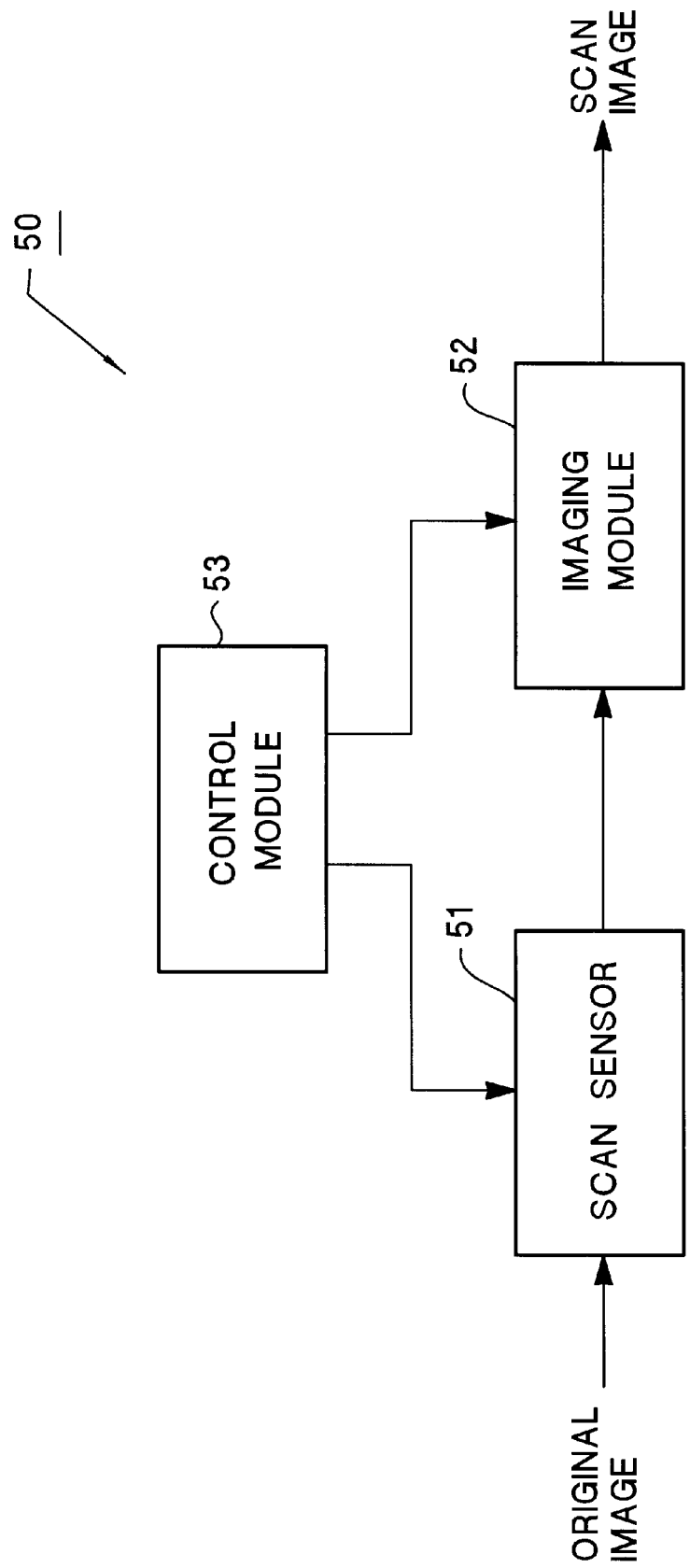
FIG. 4 shows the structure of a scanner that implements one embodiment of the present invention.

FIG. 4 shows a scanner 50 that implements one embodiment of the present invention. In accordance with one embodiment of the present invention, the scanner 50 generates a high resolution scan image with a low resolution scan sensor 51. The means that the scanner 50 increases the image resolution of a scan image without increasing the scan resolution of its scan sensor 51. This is achieved by adding more scan lines and by tilting some of the scan lines with respect with other scan lines such that at least some image pixels of any two adjacent lines are not overlapped or do not exactly coincide. The scan lines are then processed to collect and filter redundant information in order to generate the high resolution scan image.

As will be described in more detail below, the scanner 50 includes a scan sensor 51 having an array of predetermined number of imaging elements. The sensor 51 generates a plurality of scan lines of image pixels from an original image. The scanner 50 also includes a control module (i.e., the control module 53) that controls the sensor 51 to generate the scan lines. The control module 53 controls the scan sensor to 51 to cause some of the scan lines to be tilted with respect to other scan lines such that some image pixels of any two adjacent lines are not overlapped or do not exactly coincide. An imaging module (i.e., the image module 52) is also provided in the scanner 50 that processes the scan lines to collect and filter redundant information and to produce the scan image with increased image resolution without increasing scan resolution of the sensor.

In one embodiment, the control module 53 controls the scan sensor 51 to first generate the non-tilted scan lines and then controls the scan sensor 51 to generate the tilted scan lines. In this embodiment, the control module 53 controls the scan sensor 51 to first return to its initial position after generating the non-tilted scan lines. Then the control module 53 controls the scan sensor 51 to tilt and generate the tilted scan lines. Alternatively, the control module 53 controls the scan sensor 51 to tilt and generate the tilted scan lines as the scan sensor 51 moves back to its initial position after generating the non-tilted scan lines. In another embodiment, the control module 53 controls the scan sensor 53 to alternately generate the non-tilted scan lines and the tilted scan lines. The scanner 50 will be described in more detail below, also in conjunction with FIGS. 4 through 7.

In FIG. 4, the scanner 50 is a flatbed scanner (i.e., like a copier), in one embodiment. Alternatively, the scanner 50 can be any other type of scanner. For example, the scanner 50 is a fax machine-type scanner. The scanner 50 can also be an all-in-one machine that integrates the functions of scanning, copying, and printing into a single machine. Moreover, the scanner 50 can be a color scanner or a black-white scanner.

The scan sensor 51 of the scanner 50 includes an array of predetermined number of imaging elements. The imaging elements can be any known imaging elements. For example, the imaging elements can be CCD (Charge Coupled Device) cells. In addition, the imaging elements can be either black-white imaging elements or color imaging elements.

The imaging elements of the scan sensor 51 can be arranged along one dimension or two dimension. If the imaging elements of the scan sensor 51 are arranged along one dimension, the scan sensor 51 generates one line of image pixels for each scan line. If the imaging elements of the scan sensor 51 are arranged along two dimensions, the scan sensor 51 can generate multiple lines of image pixels simultaneously for each scan pass.

Figure 5:
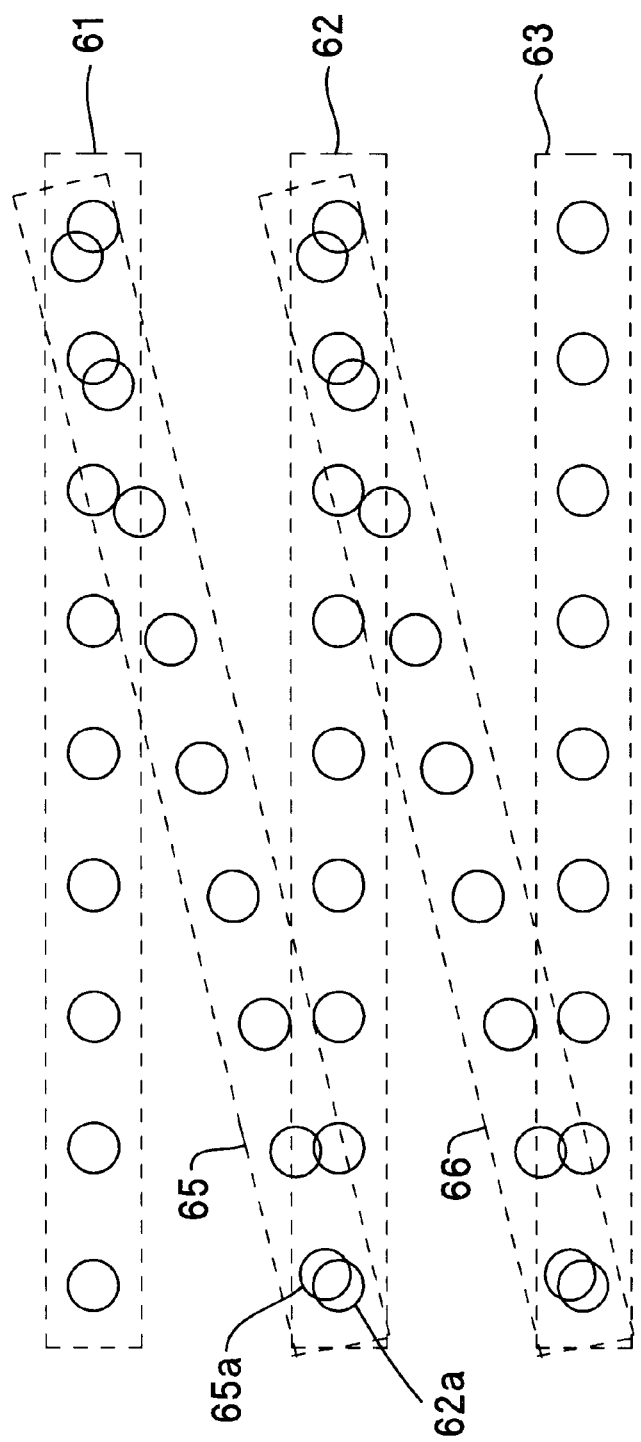
FIGS. 5 and 6 show different ways of generating the tilted scan lines by the scanner of FIG. 4.
Figure 6:
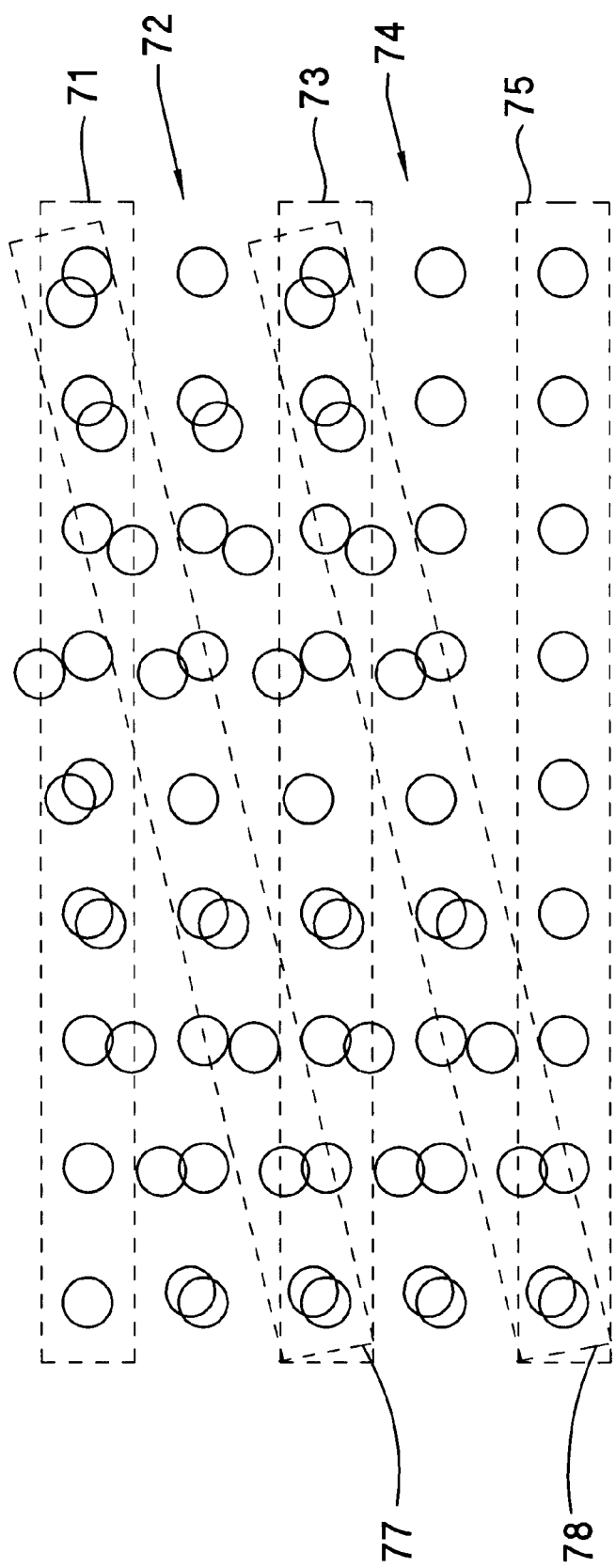

The scan sensor 51 has a predetermined scan resolution (i.e., native resolution) along the "cross" direction (which is perpendicular to the scan direction). In one embodiment, the predetermined native resolution of the scan sensor 51 is 300 dpi (Dots Per Inch). In another embodiment, the predetermined native resolution of the scan sensor 51 is 600 dpi. Alternatively, the predetermined resolution of the scan sensor 51 can be selected from 240 dpi to 1200 dpi. FIGS. 5 and 6 show in bitmap format the scan images generated by the scan sensor 51 under the control of the control module 53.

As can be seen from FIGS. 4–6, the control module 53 controls the scan sensor 51 to generate the scan lines, some of which are tilted with respect to the other scan lines. In one embodiment, the control module 53 controls the scan sensor 51 to first generate all of the non-tilted scan lines and then controls the scan sensor 51 to tilt in order to generate all of the tilted scan lines. In this embodiment, the control module 53 controls the scan sensor 51 to first return to its initial position after generating the non-tilted scan lines. Then the control module 53 controls the scan sensor 51 to tilt and generate the tilted scan lines. Alternatively, the control module 53 controls the scan sensor 51 to tilt and generate the tilted scan lines as the scan sensor 51 moves back to its initial position after generating the non-tilted scan lines. In another embodiment, the control module 53 controls the sensor 51 to alternately generate the non-tilted scan lines and the tilted scan lines. This means the control module 53 tilts the scan sensor 51 to generate a tilted scan line after the scan sensor 51 generates one or more non-tilted scan lines.

In addition, the arrangement of the non-tilted and tilted scan lines can be arranged such that a tilted scan line follows every one or more non-tilted scan lines. In one embodiment, each tilted scan line follows one non-tilted scan line (see FIG. 5). Alternatively, a tilted scan line follows every two, three, or more non-tilted scan lines (see FIG. 6).

By making some of the scan lines tilted with respect to the other scan lines, the scan sensor 51 need not be controlled to make precise advance along the scan direction. This means that the scanner 50 can be made cost effectively, without precision control mechanism to control the movement of the scan sensor 51. In this case, some of the image pixels of the tilted scan lines are completely or partially overlapped with some image pixels of the non-tilted scan lines, as can be seen from FIGS. 5–6. However, at least some of the image pixels of any tilted scan line will not exactly coincide or overlap with the image pixels of the adjacent non-tilted scan lines. These non-overlapping image pixels increase the scan resolution of the final scan image without increasing the scan density of the scan sensor 51. This also does not require the scan sensor 51 to advance precisely in order to increase the scan resolution by reducing the scan distance between any two scan lines. This is due to the fact that although a tilted scan line will have some of its image pixels overlapped with some image pixels of the adjacent non-tilted scan lines, not all of the image pixels are overlapped or exactly coincide with each other. Therefore, useful image information can still be extracted from the tilted scan lines to increase the scan resolution of the final scan image without increasing the scan density of the scan sensor 51 and without precisely controlling the advance of the scan sensor 51 to make the next scan line.

Referring back to FIG. 4, the imaging module 52 is used to process the tilted and non-tilted scan lines in order to generate the final scan image. This function of the imaging module 52 is handled by an imaging program (not shown) of the imaging module 52. The imaging program can be any know imaging software program. The imaging program of the imaging module 52 processes the scan lines obtained from the scan sensor 51 so that the final scan image can be displayed on a computer display or printed by a printer. The processing functions of the imaging module 52 may include resampling and interpolation. The imaging module 52 also includes a known display device driver program or known printer driver program.

In addition, because some of the scan lines obtained by the scan sensor 51 are tilted with respect to other scan lines obtained, the imaging module 52 also needs to collect and filter redundant information between scan lines when generating the high resolution scan image. This is done by the imaging module 52 when generating the final scan image. For example and as can be seen from FIG. 5, the image pixel 62a of the scan line 62 is partially overlapped with the image pixel 65a of the scan line 65. The redundant information between these two image pixels is collected and filtered by the imaging module 52 at the control of the control module 53. The function of collecting and filtering the redundant information between the overlapping image pixels can be realized using any known technology (such as the redundancy filtering technology used in the CapShare scanner developed by Hewlett Packard Company). Multiple overlapped pixel samples also enhances image quality by reducing sensor sampling noise.

The introduction of a tilt in the linear scan array of the scan sensor 51 results in a linear geometric skew transformation in the resulting scanned two-dimensional image. Since this random tilt varies from scan to scan, the displacement of sample image pixels in the tilted scan relative to a reference must be determined to put all points into alignment. This is done by implementing a pixel displacement estimation algorithm in the imaging module 52 to "rectify" the transformed images.

The control module 53 is used to control the operation of the scan sensor 51 to generate the tilted and non-tilted scan lines. The control module 53 also controls the imaging module 52 to generate the scan image from the tilted and non-tilted scan lines obtained from the scan sensor 51. This includes the function of eliminating any redundancy information between adjacent image pixels. The control module 53 can be implemented using any known technology.

By tilting the scan sensor 51 under the control of the control module 53, the scanner 50 does not need to have a carefully and precisely aligned linear sensor array. Rather, the scanner 50 favors a "tilted" alignment of the sensor 51, in accordance with one embodiment of the present invention. Multiple scans with random tilt angles can more reliably result in enhancements of the scan resolution of the scan image. The tilted alignment allows for novel image samples to be collected, because the random tilt forces sample points that are "off-grid" from (i.e., do not exactly coincide with) prior scanned sample points to be collected.

Figure 7:
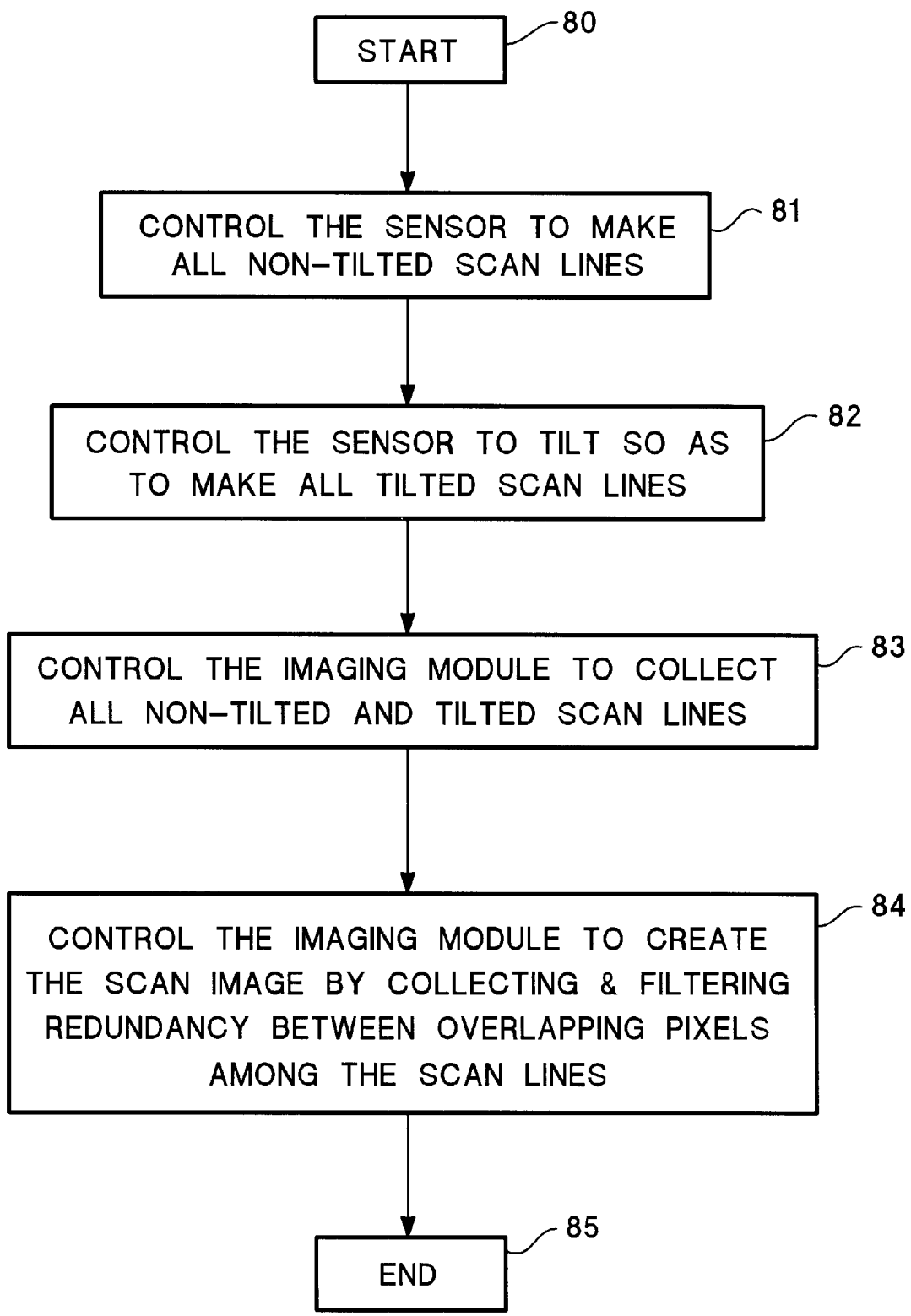
FIG. 7 is a flow chart diagram of control process of the control module of the scanner of FIG. 4 in accordance with one embodiment of the present invention.

FIG. 7 shows in flow chart diagram form the control flow of the control module 53 (FIG. 4) to generate a high resolution scan image with tilted and non-tilted scan lines in accordance with one embodiment. As can be seen from FIG. 7, the process starts at the step 80. At the step 81, the control module 53 controls the scan sensor 51 to generate all of the non-tilted scan line (e.g., the scan lines 61–63 in FIG. 5 or the scan lines 71–75 in FIG. 6). Then the step 82 is performed at which the control module 53 controls the scan sensor 51 to tilt such that tilted scan lines (e.g., the scan lines 65–66 in FIG. 5 or the scan lines 77–78 in FIG. 6) are generated. The tilted scan lines are tilted with respect to the non-tilted scan lines (see FIGS. 5–6). As described above, the tilted scan lines can be generated as the scan sensor 51 returns to its initial position. Moreover, the non-tilted and tilted scan lines can be collected alternately. This means that a tilted scan line follows every non-tilted scan line. Alternatively, a tilted scan line can follow every two, three, or more non-tilted scan lines.

The step 83 is then performed at which the control module 53 controls the imaging module 52 to collect all scan lines, including the tilted scan lines. The control module 53 then, at the step 84, controls the imaging module 52 to process the scan lines to generate the final scan image for display or printing. As described above, one of the functions of the imaging module 52 is to collect and filter the redundant information between the overlapping image pixels when generating the final scan image. The process then ends at the step 85.

Figure 8:
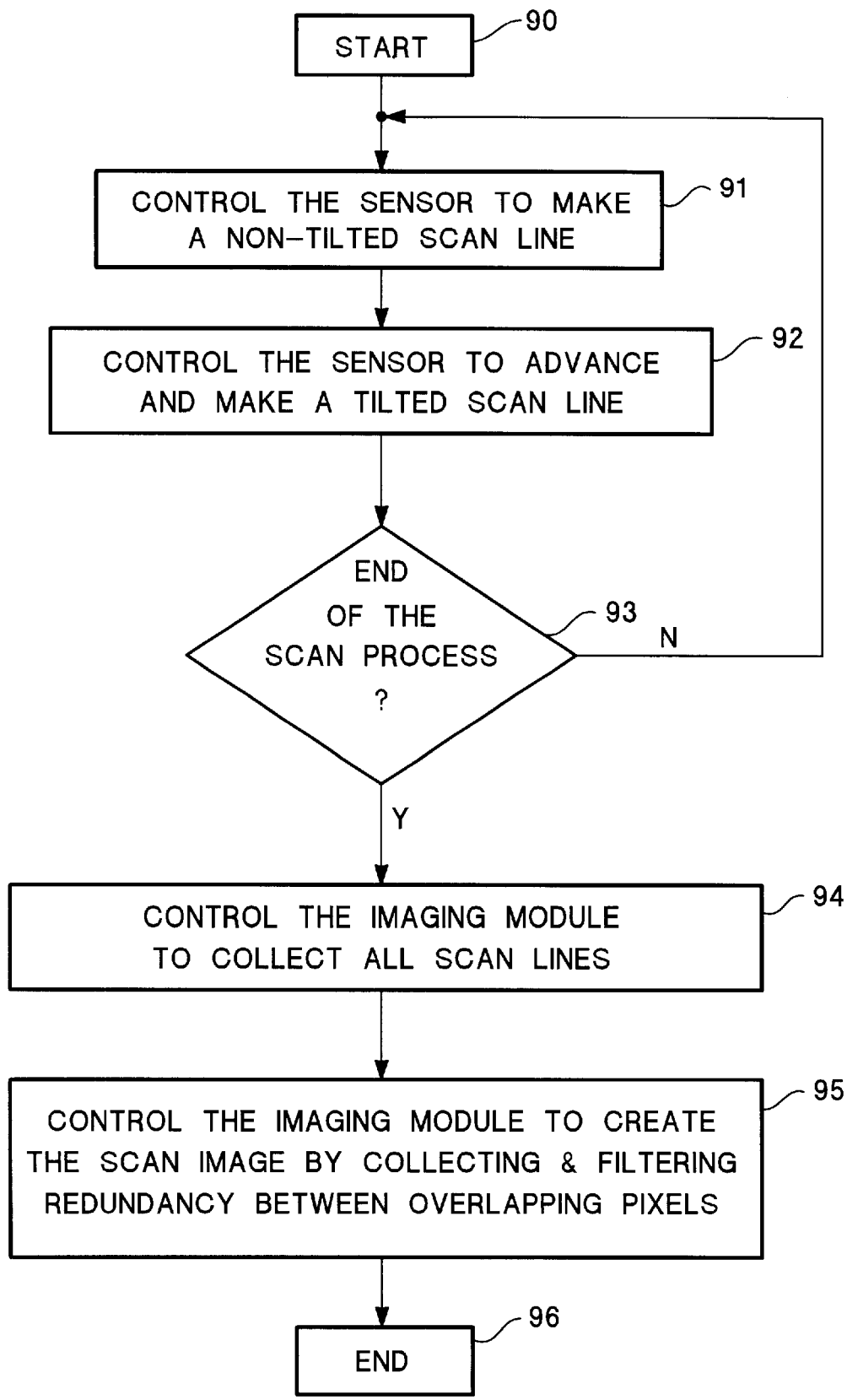
FIG. 8 is a flow chart diagram of control process of the control module of the scanner of FIG. 4 in accordance with another embodiment of the present invention.

FIG. 8 shows in flow chart diagram form the control flow of the control module 53 (FIG. 4) to generate a high resolution scan image with tilted and non-tilted scan lines in accordance with another embodiment of the present invention. As can be seen from FIG. 8, the process starts at the step 90. At the step 91, the control module 53 controls the scan sensor 51 to generate one non-tilted scan line (e.g., the scan line 61 or 62 in FIG. 5 or the scan line 71 or 72 in FIG. 6). Then the step 92 is performed at which the control module 53 controls the scan sensor 51 to advance a predetermined scan distance in order to generate the next scan line. In addition, the control module 53 causes the scan sensor 51 to tilt such that a tilted scan line (e.g., the scan line 65 or 66 in FIG. 5 or the scan line 77 or 78 in FIG. 6) is generated. The tilted scan line is tilted with respect to the other non-tilted scan lines (see FIGS. 5–6). As described above, the tilted scan lines can be generated as the scan sensor 51 returns to its initial position. Moreover, the non-tilted and tilted scan lines can be generated alternately. This means that a tilted scan line is made after every non-tilted scan line is generated. Alternatively, a tilted scan line is made after every two, three, or more non-tilted scan lines are generated.

The step 93 is then performed at which the control module 53 determines whether the scan sensor 51 has reached the bottom of the scan window (i.e., no more scanning). If the answer is no, the process returns to the step 91. If the answer is yes, the step 94 is performed at which the control module 53 controls the imaging module 52 to collect all scan lines, including the tilted scan lines. The control module 53 then, at the step 95, controls the imaging module 52 to process the scan lines to generate the final scan image for display or printing. As described above, one of the functions of the imaging module 52 is to collect and filter the redundant information between the overlapping image pixels when generating the final scan image. The process then ends at the step 96.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An image scanning apparatus, comprising:
   (A) a sensor having an array of imaging elements to generate a plurality of scan lines of image pixels from an original image;
   (B) a control module that controls the sensor to generate the scan lines, some of the scan lines are tilted with respect to other scan lines such that some image pixels of any two adjacent lines are not overlapped;
   (C) an imaging module that generates a scan image from the scan lines such that image resolution of the scan image is increased without increasing the scan resolution of the sensor.

2. The image scanning apparatus of claim 1, wherein the control module controls the sensor to generate the tilted scan lines such that no precise movement of the scan sensor is required to increase the image resolution of the scan image.

3. The image scanning apparatus of claim 1, wherein the imaging module processes the overlapped image pixels such that redundant image information is collected and filtered from the scan image with increased image resolution.

4. The image scanning apparatus of claim 1, wherein the sensor generate all non-tilted scan lines before being tilted to generate all tilted scan lines.

5. The image scanning apparatus of claim 4, wherein the sensor generates the scan lines, one scan line at a time, wherein each of the tilted scan lines is between at least two non-tilted scan lines.

6. The image scanning apparatus of claim 1, wherein the sensor generates the tilted and non-tilted scan lines alternately.

7. The image scanning apparatus of claim 1, wherein the sensor generates the tilted scan lines as the sensor returns to its initial starting position.

8. The image scanning apparatus of claim 1, wherein the sensor has a predetermined scan resolution that is lower than the image resolution of the scan image produced from the imaging module.

9. A method of enhancing image resolution of a scan image using a low scan resolution scan sensor, comprising the steps of
   (A) generating a plurality of scan lines of image pixels from an original image using a scan sensor having an array of imaging elements, wherein some of the scan lines are tilted with respect to other scan lines such that some image pixels of any two adjacent lines are not overlapped or do not exactly coincide;
   (B) generating the scan image from the scan lines such that image resolution of the scan image is increased without increasing the scan resolution of the scan sensor, wherein the scan image is generated by processing the scan lines to collect and filter redundant information from the scan image.

10. The method of claim 9, wherein the step (A) further comprises the steps of
    advancing the scan sensor for a predetermined scan distance after the scan sensor produced a non-tilted scan line;
    tilting the scan sensor to produce a tilted scan line such that at least some image pixels of the tilted scan line are not overlapped or exactly coincide with some image pixels of the adjacent straight scan line.

11. The method of claim 10, wherein the step (B) further comprises the step of processing the scan lines such that redundant image information is collected and filtered from the scan image with increased image resolution.

12. The method of claim 9, wherein the step (A) further comprises the steps of
    generating all non-tilted scan line;
    tilting the scan sensor to produce all tilted scan lines such that at least some image pixels of the tilted scan line are not overlapped or exactly coincide with some image pixels of the adjacent straight scan line.

13. The method of claim 12, wherein the step of tilting the scan sensor to produce all tilted scan lines is performed as the scan sensor moves back to its initial starting position.

14. The method of claim 12, wherein the step of tilting the scan sensor to produce all tilted scan lines is performed after the scan sensor moves back to its initial starting position.

15. The method of claim 12, wherein the step (B) further comprises the step of processing the scan lines such that redundant image information is collected and filtered from the scan image with increased image resolution.

16. The method of claim 9, wherein the tilted scan lines are generated such that no precise movement of the scan sensor is required to increase the image resolution of the scan image.

17. The method of claim 9, wherein each of the tilted scan lines is generated between two non-tilted scan lines.

18. The method of claim 9, wherein the sensor has a predetermined scan resolution that is lower than the image resolution of the scan image produced from the imaging module.

* * * * *